(12) United States Patent
Lehmann et al.

(10) Patent No.: US 11,518,231 B2
(45) Date of Patent: Dec. 6, 2022

(54) HYBRID MODULE HAVING A HYDRAULICALLY COOLED FRICTION CLUTCH, AND HYBRID DRIVE TRAIN

(71) Applicant: Schaeffler Technologies AG & Co. KG, Herzogenaurach (DE)

(72) Inventors: Steffen Lehmann, Ettlingen (DE); Andreas Trinkenschuh, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 174 days.

(21) Appl. No.: 16/619,855

(22) PCT Filed: May 15, 2018

(86) PCT No.: PCT/DE2018/100458
§ 371 (c)(1),
(2) Date: Dec. 5, 2019

(87) PCT Pub. No.: WO2018/228637
PCT Pub. Date: Dec. 20, 2018

(65) Prior Publication Data
US 2020/0156455 A1 May 21, 2020

(30) Foreign Application Priority Data
Jun. 13, 2017 (DE) ...................... 10 2017 112 981.2

(51) Int. Cl.
*B60K 6/387* (2007.10)
*B60K 6/26* (2007.10)
(Continued)

(52) U.S. Cl.
CPC ................ *B60K 6/387* (2013.01); *B60K 6/26* (2013.01); *B60K 6/405* (2013.01); *F16D 13/52* (2013.01);
(Continued)

(58) Field of Classification Search
CPC .......... B60K 6/405; B60K 6/26; B60K 6/387; F16D 13/52; F16D 13/72; F16D 13/74;
(Continued)

(56) References Cited

U.S. PATENT DOCUMENTS 4,023,661 A * 5/1977 Flotow .................... F16D 13/48
192/113.34
2007/0049445 A1   3/2007 Reisch et al.

FOREIGN PATENT DOCUMENTS

CN    103079860 A * 5/2013 ............... B60K 6/20
DE    102006008205 A1   10/2006
(Continued)

*Primary Examiner* — Stacey A Fluhart

(57) ABSTRACT

A hybrid module for a drive train of a motor vehicle includes a housing, an electric machine disposed within the housing. The electric machine having a stator and a rotor arranged radially within the stator. The hybrid module having at least one hydraulically cooled friction clutch arranged radially within the rotor. A cooling device is provided that is configured to cool a plurality of friction surfaces of the at least one friction clutch and which has an annular collecting region coupled to the rotor for conjoint rotation therewith and entraining a hydraulic medium during operation, as well as a scoop section, which is secured to the housing and projects into the collecting region and via which the hydraulic medium is fed to a retaining chamber during operation.

11 Claims, 8 Drawing Sheets

(51) Int. Cl.
   *B60K 6/405*    (2007.10)
   *F16D 13/52*    (2006.01)
   *F16D 13/72*    (2006.01)
   *F16D 13/74*    (2006.01)
   *F16D 21/00*    (2006.01)
   *H02K 7/00*     (2006.01)
   *H02K 7/108*    (2006.01)
   *H02K 9/193*    (2006.01)
   *B60K 6/48*     (2007.10)

(52) U.S. Cl.
   CPC ............ *F16D 13/72* (2013.01); *F16D 13/74* (2013.01); *F16D 21/00* (2013.01); *H02K 7/006* (2013.01); *H02K 7/108* (2013.01); *H02K 9/193* (2013.01); *B60K 6/48* (2013.01); *B60Y 2400/428* (2013.01)

(58) Field of Classification Search
   CPC ..... F16D 21/00; B60Y 2400/428; H02K 7/00; H02K 7/108
   See application file for complete search history.

(56) References Cited

FOREIGN PATENT DOCUMENTS

| | | | |
|---|---|---|---|
| DE | 102008006062 A | 2/2009 | |
| DE | 102009059928 A1 | 7/2010 | |
| DE | 102009059944 A1 | 7/2010 | |
| DE | 102010014675 A1 | 10/2010 | |
| DE | 102011005724 A | 9/2012 | |
| JP | 2016030526 A * | 3/2016 | |
| WO | WO-2008092426 A2 * | 8/2008 | ............... B60K 6/40 |

* cited by examiner

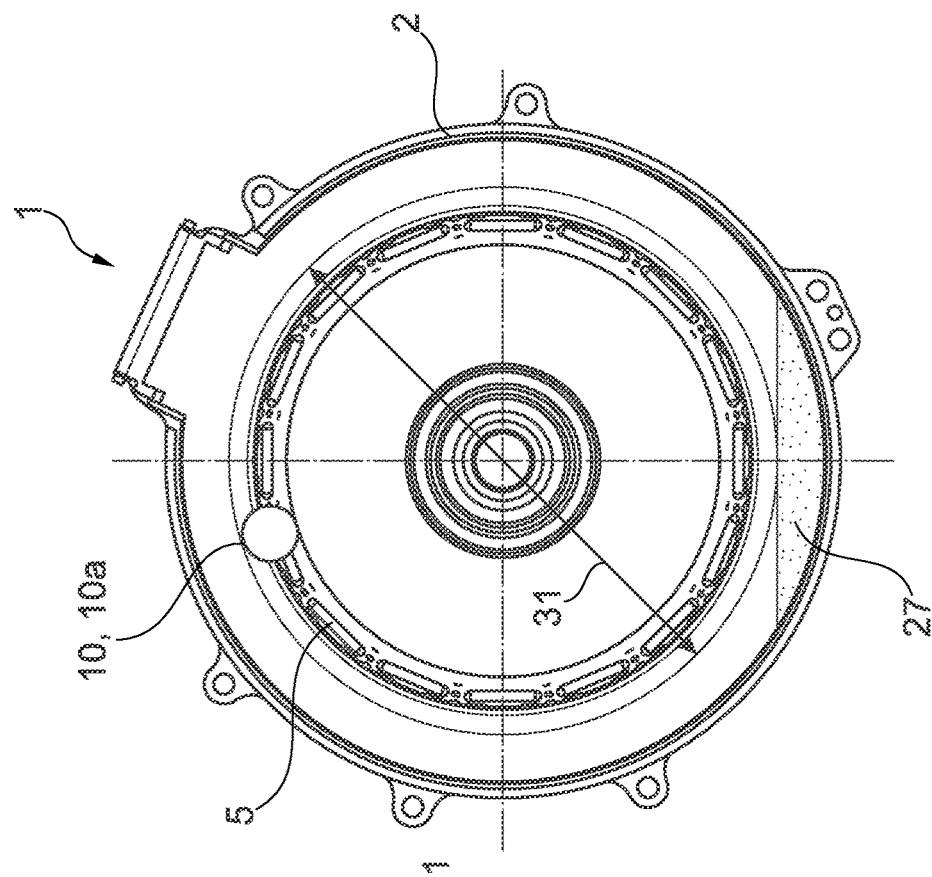
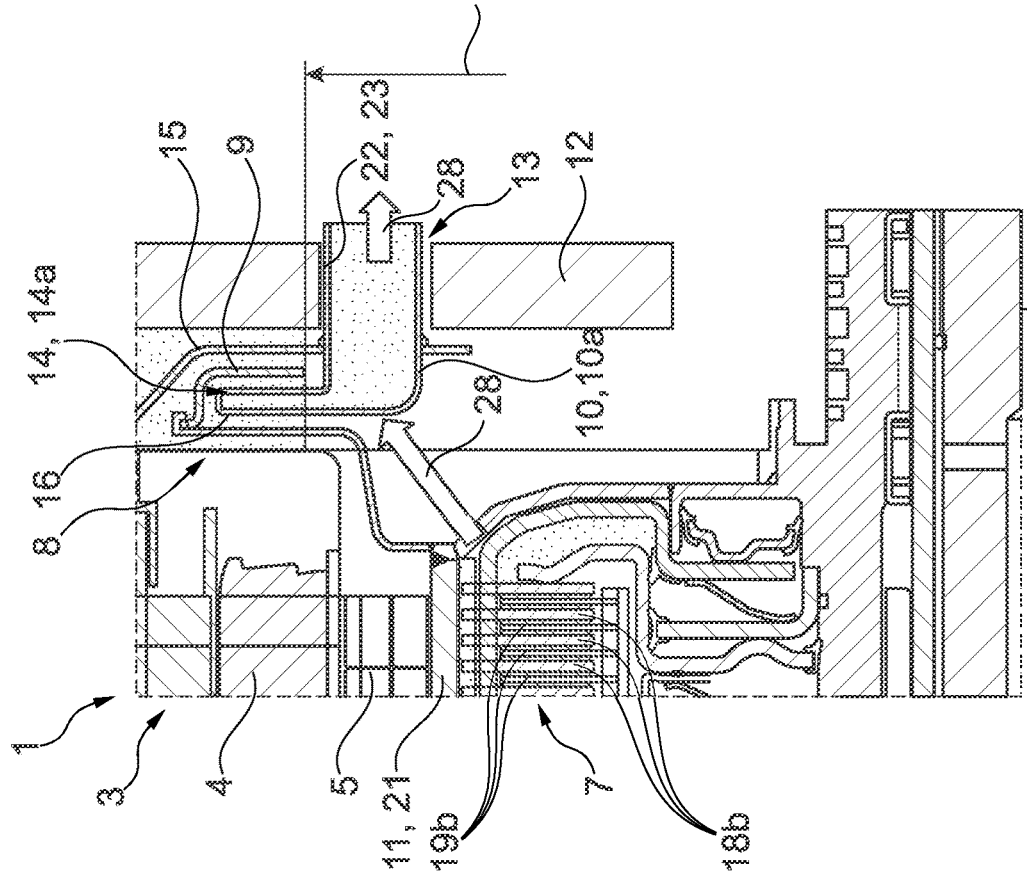

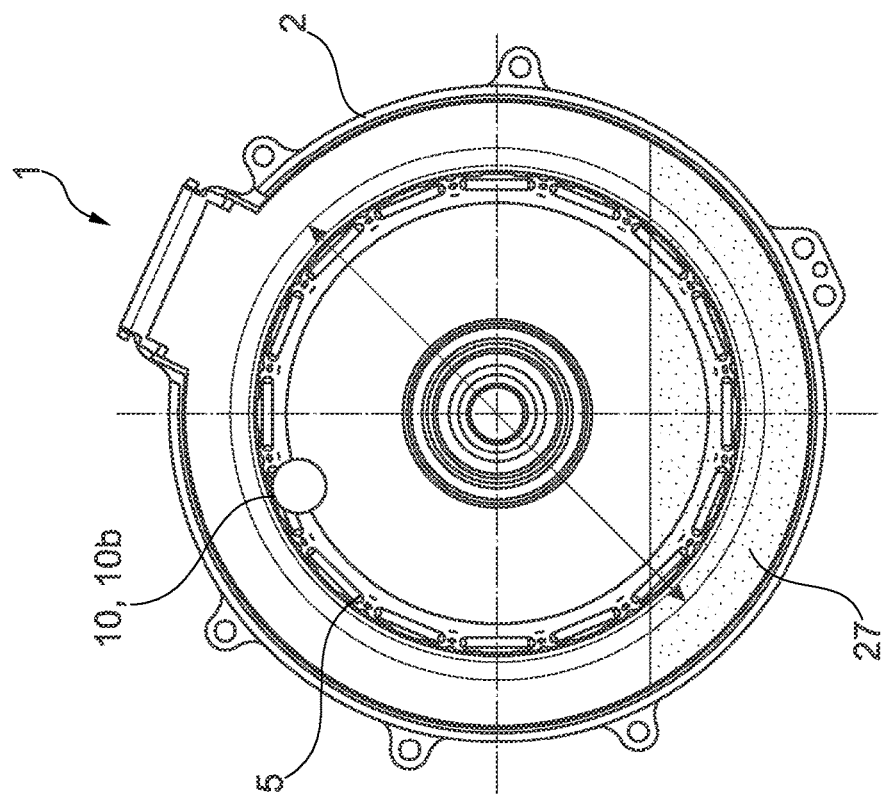
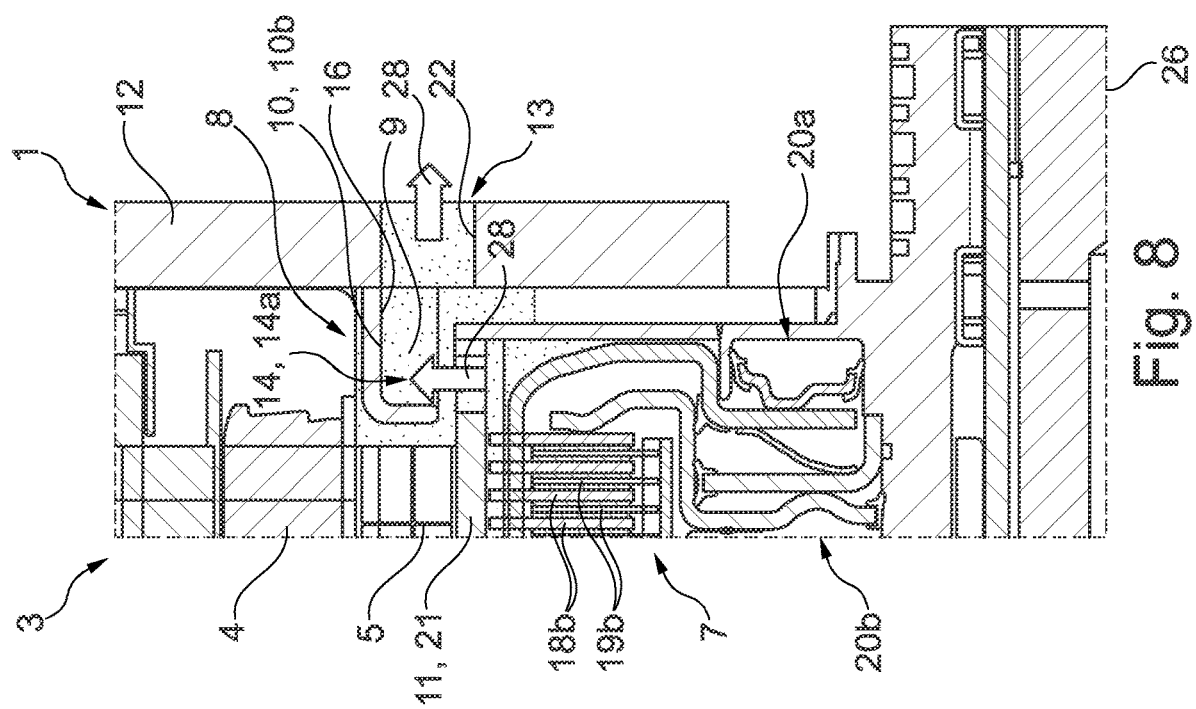

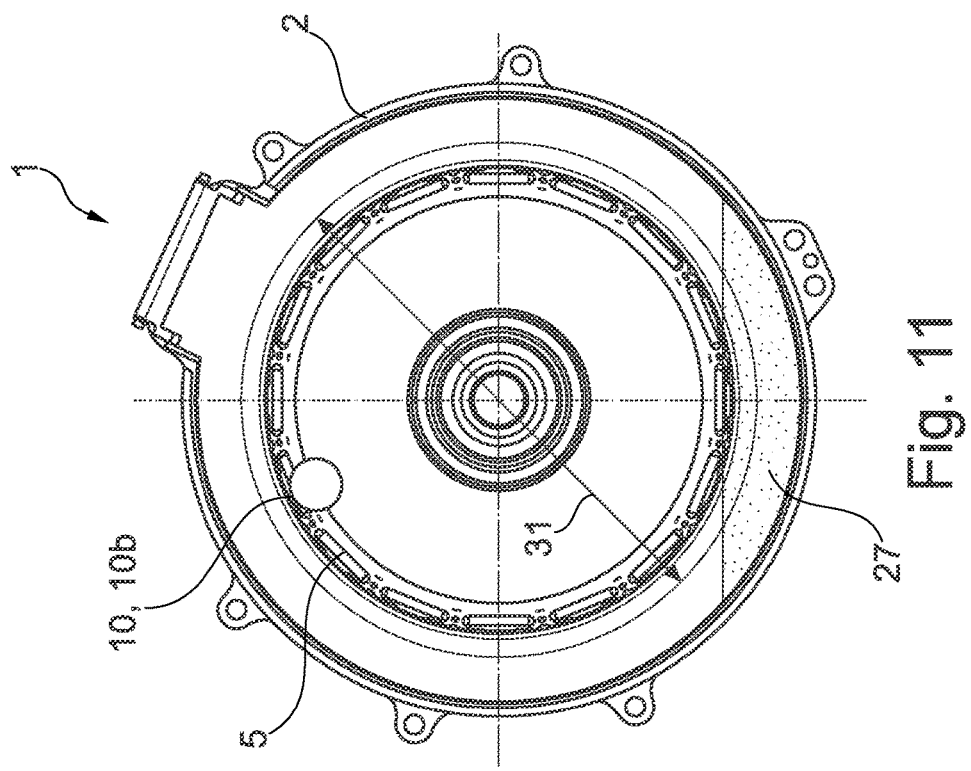
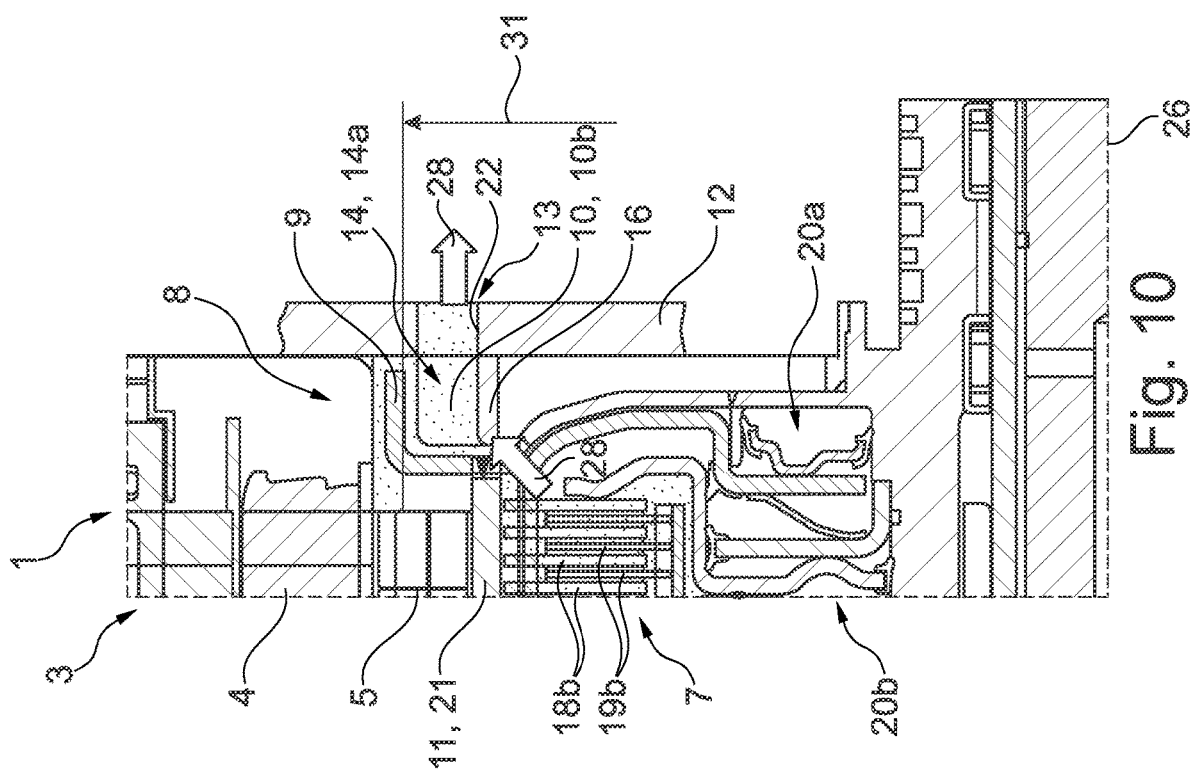

HYBRID MODULE HAVING A HYDRAULICALLY COOLED FRICTION CLUTCH, AND HYBRID DRIVE TRAIN

CROSS-REFERENCE TO RELATED APPLICATIONS

This application is the U.S. National Phase of PCT Appln. No. PCT/DE2018/100458 filed May 15, 2018, which claims priority to DE 10 2017 112 981.2 filed Jun. 13, 2017, the entire disclosures of which are incorporated by reference herein.

TECHNICAL FIELD

The disclosure relates to a hybrid module for a drive train of a motor vehicle, such as a passenger car, a heavy goods vehicle, a bus or some other commercial vehicle, comprising a housing, an electric machine accommodated/arranged in the housing and having a stator and a rotor arranged radially within the stator, and at least one hydraulically cooled/liquid-cooled friction clutch arranged radially within the rotor. Moreover, the disclosure relates to a hybrid drive train for a motor vehicle, having said hybrid module.

BACKGROUND

Prior art of the type in question is known from DE 10 2009 059 944 A1, for example. In this document, a hybrid module for a drive train of a vehicle, having a first separating clutch, an electric motor and a second separating clutch, is disclosed. The first separating clutch is arranged in the torque flow between an internal combustion engine in the drive train and the electric motor, and the second separating clutch is arranged in the torque flow between the electric motor and a transmission in the drive train. The first separating clutch and the second separating clutch are arranged in a common wet space. In an advantageous illustrative embodiment, a pressure medium passed through this wet space cools a plurality of friction plates of two wet clutches and flows radially outward, from where it is scooped up by a scoop tube connected in a fixed manner to a transmission housing by means of guide pins and is fed to a transmission sump via a discharge line.

Additional prior art is disclosed by DE 10 2006 008 205 A1.

With the known embodiments, however, there is the disadvantage that cooling of the components arranged radially within the electric machine, such as friction clutches, is relatively difficult. This is due especially to the fact that the hydraulic medium used for cooling accumulates in interstitial regions of the rotor and to some extent also in interstitial regions of the stator, from where it can be removed only with relative difficulty.

SUMMARY

It is therefore the object of the present disclosure to eliminate the disadvantages known from the prior art and, in particular, to make available a hybrid module which is as compact as possible in terms of installation space and the friction clutches of which can be cooled as effectively as possible.

This is achieved by virtue of the fact that a cooling device is provided which is designed to cool a plurality of friction surfaces of the at least one friction clutch and which has an annular collecting region coupled to the rotor for conjoint rotation therewith and entraining a hydraulic medium during operation, as well as a scoop section, which is secured to the housing and projects into the collecting region and via which the hydraulic medium is fed to a retaining chamber (arranged outside the housing) during operation.

A geometry by means of which the hydraulic medium previously used to cool the friction surfaces is carried directly out of the housing is thereby defined within the electric motor. A buildup of heat in regions of the rotor and the stator is thereby avoided. This also enhances the performance of the hybrid module.

Further advantageous embodiments are claimed in the claims and are explained in greater detail below.

The collecting region is arranged radially outside the friction surfaces/friction elements of the at least one friction clutch. The collecting region is preferably formed as a channel which runs all the way round in the circumferential direction and is open inward in the radial direction. The channel is formed in a U shape or L shape when viewed in cross section. This further simplifies the construction and production complexity of the collecting region.

It is furthermore expedient if the collecting region is mounted for conjoint rotation on a rotor support supporting the rotor. As a result, the collecting region is, in turn, of particularly simple construction.

As regards the attachment of the collecting region to the rotor support, it is advantageous to form the collecting region in a materially integral manner with the rotor support.

It is furthermore expedient to form the collecting region separately from the rotor support and to secure it on the rotor support. In this context, there is a preference for attaching the collecting region materially to the rotor support, e.g. welding it on. As an alternative to this material attachment, there is a further preference for attaching the collecting region to the rotor support by means of a nonpositive and/or material connection. In this context, latching/snap connections are preferred. There is also a further preference for press-fitting the collecting region into or onto the rotor support.

If a first scoop section is provided which is designed as a scoop tube that enters the collecting region, the scoop section can be produced in a particularly simple manner. This enables the scoop section to be pre-shaped and adapted structurally to the collecting region in any desired manner.

If the scoop tube projects through a through hole introduced into a side wall secured to the housing, the hydraulic medium is discharged from the housing along a direct path. For this purpose, there is a particular preference for the scoop tube to have an (axially extending) discharge line passing through a side wall secured to the housing.

It is furthermore advantageous if a second scoop section is provided (in addition or as an alternative to the first scoop section), which is designed as a scoop projection attached directly to the side wall secured to the housing, preferably being formed in a materially integral manner with said side wall secured to the housing. The scoop section is thereby formed directly at the same time as the formation of the side wall.

It is also expedient if the at least one scoop section has at least one inlet opening, as a further preference at least two inlet openings, which faces (face) in the circumferential direction of the rotor and projects (project) into the collecting region in the radial direction.

If the at least one scoop section is produced/formed from a plastic/plastics material, the scoop section can be formed in a low-cost manner. In this regard, it is also advantageous if the at least one scoop section is alternatively formed from a metal, e.g. a metal sheet/steel sheet. This makes the scoop section particularly easy to produce by forming.

In this context, it is furthermore expedient if the collecting region is likewise produced from a metal. A metal sheet processed by forming is particularly suitable for the formation of the collecting region.

It is furthermore advantageous if a plurality of scoop sections is arranged in a manner distributed in the circumferential direction.

If the at least one scoop section is secured directly or indirectly on the housing by means of a holding element, the scoop section is held/supported in a sufficiently secure way in the hybrid module.

The at least one scoop section is, in turn, preferably attached positively, nonpositively and/or materially to the holding element. In this case, there is a particular preference for welded joints as a material connection, a snap/clip-in joint as a positive connection or a press-fit joint in the form of a nonpositive connection.

Furthermore, the disclosure relates to a hybrid drive train for a motor vehicle, having the hybrid module according to the disclosure in accordance with at least one of the embodiments described above.

In other words, according to the disclosure an oil-cooled hybrid clutch (friction clutch of the hybrid module) is implemented with a scoop tube. A cooling fluid/a hydraulic medium used for cooling, such as a cooling oil, which is provided for cooling in the at least one friction clutch, is collected using a cooling-fluid collecting ring (collecting region). The cooling-fluid collecting ring, in turn, is connected to the rotor for conjoint rotation therewith. The cooling fluid is discharged in an adjacent region or into an adjacent chamber (retaining chamber), of a transmission for example, using a cooling-fluid diverter line (scoop tube) or a cooling-fluid collecting projection (scoop projection).

BRIEF DESCRIPTION OF THE DRAWINGS

The disclosure is now described in greater detail below with reference to figures, in the context of which various embodiments are illustrated.

In the drawings:

FIG. 4: shows a longitudinal section through a segment of a hybrid module according to the disclosure in accordance with a second illustrative embodiment, wherein the collecting region is now arranged adjacent to a stator when viewed in an axial direction of the hybrid module, FIG. 5: shows a front view of the hybrid module according to FIG. 4 in order to illustrate the position of the scoop section, FIG. 8: shows a longitudinal section through a segment of a hybrid module according to the disclosure in accordance with a fourth illustrative embodiment, wherein the scoop section is now formed as a scoop projection formed integrally on a side wall secured to the housing, FIG. 9: shows a front view of the hybrid module according to FIG. 8 in order to illustrate the position of the scoop section, FIG. 10: shows a longitudinal section through a segment of a hybrid module according to the disclosure in accordance with a fifth illustrative embodiment, wherein the collecting region is substantially L-shaped when viewed in section and interacts with a scoop projection forming the scoop section, FIG. 11: shows a front view of the hybrid module according to FIG. 10 in order to illustrate the position of the scoop section.

DETAILED DESCRIPTION

The figures are of a purely schematic nature and serve only to aid understanding of the disclosure. Identical elements are provided with the same reference signs. Moreover, the various features of the different illustrative embodiments can be combined freely with one another.

Figure 1:
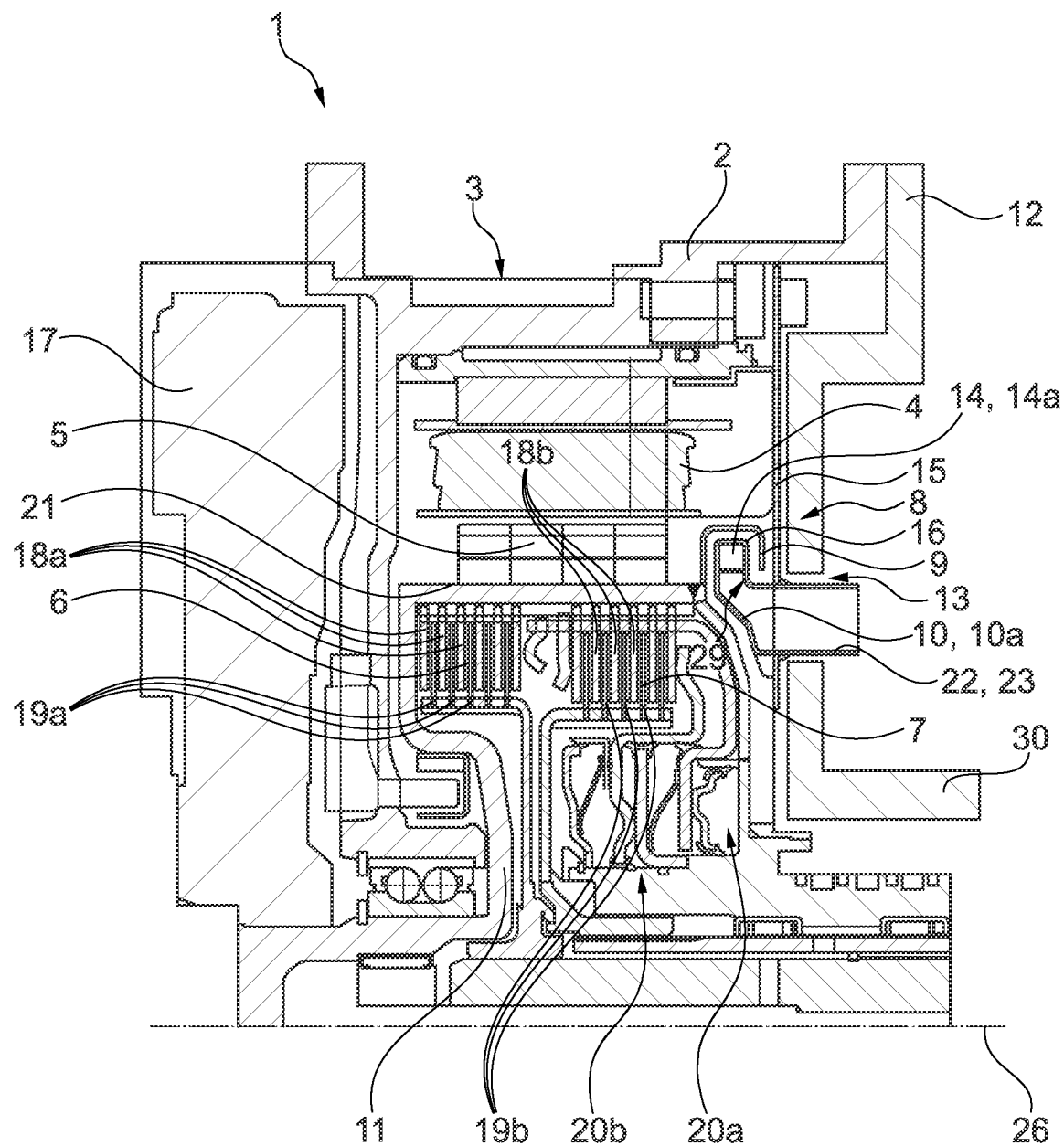
FIG. 1: shows a longitudinal section through a hybrid module according to the disclosure in accordance with a first illustrative embodiment, wherein it is clearly visible how an annular collecting region of a cooling device of the hybrid module is attached to a rotor support and interacts with a scoop section designed as a scoop tube.

In combination with FIG. 1, the construction of a hybrid module 1 according to the disclosure is readily apparent. The hybrid module 1 is embodied as a hybrid module of the coaxial type or, alternatively, of the axially parallel type. Accordingly, the hybrid module 1 has a housing 2, within which an electric machine/an electric motor 3 is arranged. The electric motor 3 is arranged with its rotor 5 coaxially with an axis of rotation 26 of the hybrid module 1 (i.e. of its friction clutches 6, 7). During operation, the housing 2 is furthermore connected to a component secured to the vehicle, in this case a transmission, namely a transmission housing of the transmission. In particular, the housing 2 in this embodiment is formed directly by a side wall of 12 of the transmission/transmission housing.

A stator 4 of the electric machine 3 is accommodated in a fixed manner in the housing 2. The rotor 5 is mounted in such a way as to be rotatable relative to said stator 4 and is arranged radially within the stator 4. The rotor 5, in turn, is mounted rotatably on a rotor support 11. The rotor 5 is mounted rotatably on a radial outer side of a sleeve region 21 formed on the rotor support 11 and extending in the axial direction (in relation to the axis of rotation 26). The rotor support 11 is mounted/supported radially and axially on the housing 2. During operation, the rotor support 11 is typically coupled rotationally to an output shaft of an internal combustion engine, such as a spark-ignition or diesel engine, which is not illustrated further here for the sake of clarity. In FIG. 1, the rotor support 11 is already connected rotationally to a torsional vibration damper 17, which is embodied as a dual-mass flywheel. During operation, the torsional vibration damper 17 is furthermore connected directly to the crankshaft for conjoint rotation therewith on the side of the damper facing axially away from the rotor support.

The rotor support 11 typically serves as a rotary input part of two friction clutches 6 and 7. The two friction clutches 6 and 7 are each embodied as multiplate friction clutches and thus each have a plate pack. The two friction clutches 6 and 7 are embodied as sub-clutches and together form a double clutch. A plurality of first friction elements 18a, 18b of the respective friction clutch 6 or 7, each spaced apart in the axial direction and being movable relative to one another in the axial direction, is connected for conjoint rotation to the rotor support 11. The first friction elements 18a of the first friction clutch 6 are arranged spaced apart in the axial direction and alternate in the axial direction with second friction elements 19a of the first friction clutch 6. The first friction elements 18a and the second friction elements 19a of the first friction clutch 6 are each formed in the manner of plates/as friction plates. The first friction elements 18a and the second friction elements 19a of the first friction clutch 6 together form a first plate pack. The first friction elements 18b of the second friction clutch 7 are arranged spaced apart in the axial direction and alternate in the axial direction with second friction elements 19b of the second friction clutch 7. The first friction elements 18b and the second friction elements 19b of the second friction clutch 7 are likewise each formed in the manner of plates/as friction plates. The first friction elements 18b and the second friction elements 19b of the second friction clutch 7 together form a second plate pack. During operation, the friction clutches 6, 7 can be moved in a known manner between the open and closed positions thereof by means of various actuating devices 20a and 20b.

The friction clutches 6 and 7 are both arranged radially within the rotor 5, namely radially within the sleeve region 21 of the rotor support 11, said sleeve region accommodating the rotor 5. Moreover, the friction clutches 6, 7 are both arranged within two mutually opposite side faces of the stator 4 in the axial direction. In particular, the friction elements 18a, 18b and 19a, 19b of the two plate packs are arranged axially completely within these two mutually opposite side faces.

The friction clutches 6, 7 are designed as hydraulically cooled/liquid-cooled, i.e. wet, clutches. During operation, a cooling device 8 serves to cool the friction elements 18a, 18b, 19a, 19b by means of a hydraulic fluid flowing through the interior of the housing 2. An illustrative flow path of the hydraulic medium is illustrated by the direction arrows 28 in FIG. 2.

To discharge the hydraulic medium flowing past the friction elements 18a, 18b, 19a, 19b owing to the effective centrifugal force from the housing 2, the cooling device 8 has an annular collecting region 9 radially outside the friction elements 18a, 18b, 19a, 19b, said region interacting with a scoop section 10. The collecting region 9 is designed as a channel which is open inward in the radial direction and is coupled to the rotor 5 for conjoint rotation therewith. The collecting region 9 extends all the way round in the circumferential direction. In principle, the collecting region 9 is arranged in such a way that it takes up/collects the majority of the hydraulic medium conveyed outward during operation. The collecting region 9 is arranged at one axial end of the sleeve region 21. The collecting region 9 is attached to the sleeve region 21 in such a way that a radially inward-facing entry/opening 29 (FIG. 1) of the collecting region 9 is not covered by the sleeve region 21.

A scoop section 10 projects into the collecting region 9 radially from the inside. In this illustrative embodiment according to FIG. 1, the scoop section 10 is designed as a first scoop section 10a in the form of a scoop tube. The first scoop section 10a has an inlet opening 14; 14a, 14b, which projects into the collecting region 9 in the radial direction. The scoop section 10 serves to carry the hydraulic medium away and back toward a retaining chamber outside the housing 2 of the hybrid module 1, said chamber not being illustrated in this illustrative embodiment for the sake of clarity.

Figure 12:
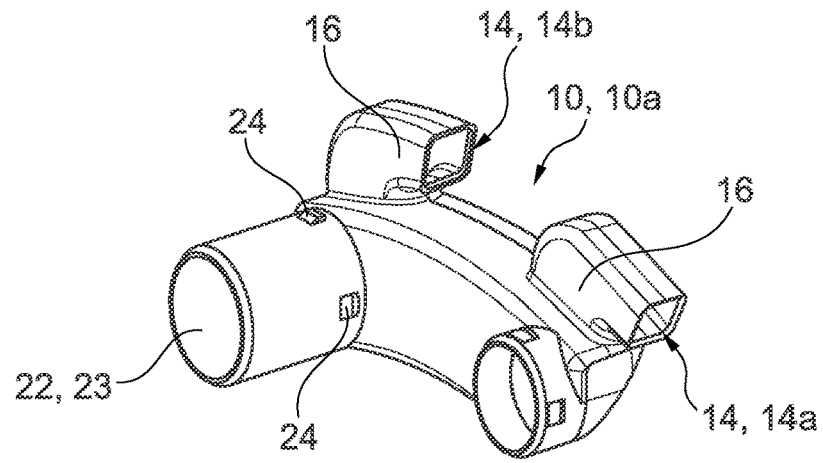
FIG. 12: shows a perspective illustration of the scoop section, which is designed as a scoop tube, as used in the hybrid module of the first illustrative embodiment.
Figure 13:
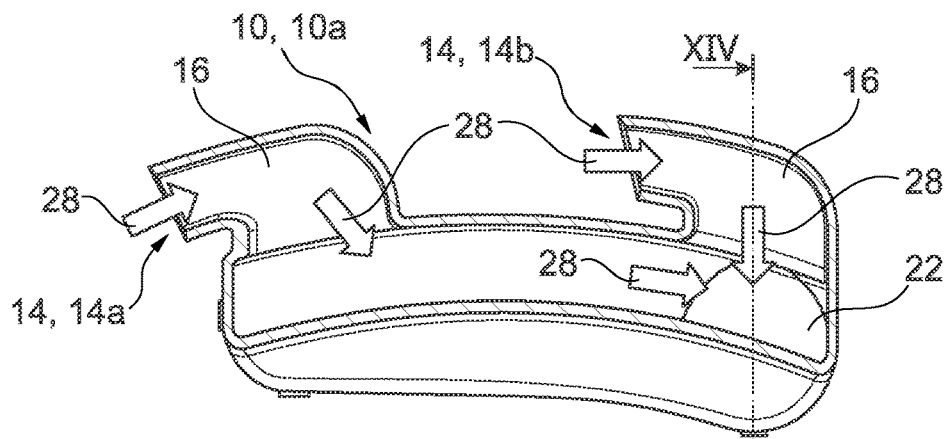
FIG. 13: shows a longitudinal section through the scoop tube illustrated in FIG. 12, wherein the section plane is chosen so that two scoop cups, each forming an inlet opening, are readily visible.
Figure 14:
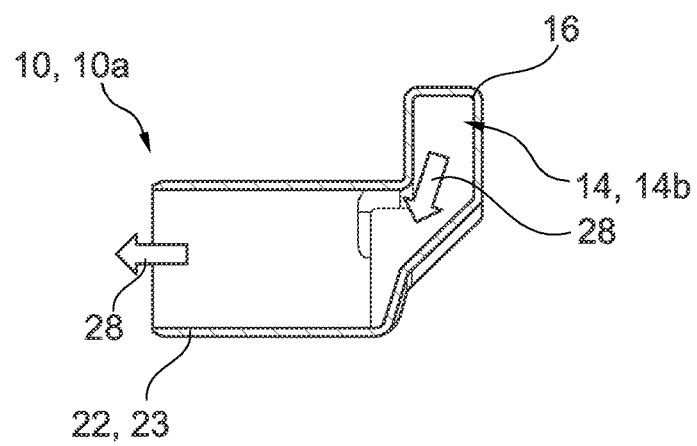
FIG. 14: shows a cross section of the scoop tube shown in FIGS. 12 and 13 along the section line denoted by "XIV-XIV" in FIG. 13.

Further details of the design of the first scoop section 10a are clarified in conjunction with FIGS. 12 to 14. It can be seen therein that the first scoop section 10a has/forms two inlet openings 14a and 14b, which are spaced apart in the circumferential direction. Each inlet opening 14a, 14b is formed by a scoop cup 16/scoop-cup-type blade geometry. The respective scoop cup 16 diverts the hydraulic medium inward in the radial direction. The hydraulic medium flowing through the first scoop section 10a is illustrated in FIG. 13 by means of the direction arrows 28. The passages formed by the scoop cups 16 open inward in the radial direction of the axis of rotation 26 into a discharge line 22. The discharge line 22 extends along the axial direction/axis of rotation 26. The discharge line 22 carries the hydraulic medium scooped out of the collecting region 9 by the scoop cups 16 out of the housing 2 when the rotor 5 is rotating. The discharge line 22 is implemented essentially by a tubular stub 23 The discharge line 22 penetrates a side wall 12 that forms part of the housing 2.

In this illustrative embodiment, the first scoop section 10a is designed as a plastic component. In principle, however, embodiments as a metal part, e.g. consisting of a metal sheet, are also conceivable.

Retaining projections in the form of latching projections 24, which are latched positively in a holding element 15 in the secured state shown in FIG. 1, are provided on the stub 23. The first scoop section 10a is thus positively locked during operation. The holding element 15 is in the form of a holding plate/of plate-shaped configuration/of disk-shaped configuration. The holding element 15 is furthermore secured in a fixed location on the housing 2. In this context, it should also be noted that, in principle, other ways of attaching the first scoop section 10a are possible. Accordingly, the first scoop section 10a in further embodiments is attached materially to the holding element 15, e.g. by means of a welded joint. Purely nonpositive connections, such as a press fit for the discharge line 22 in the holding element 15, are also conceivable.

Figure 2:
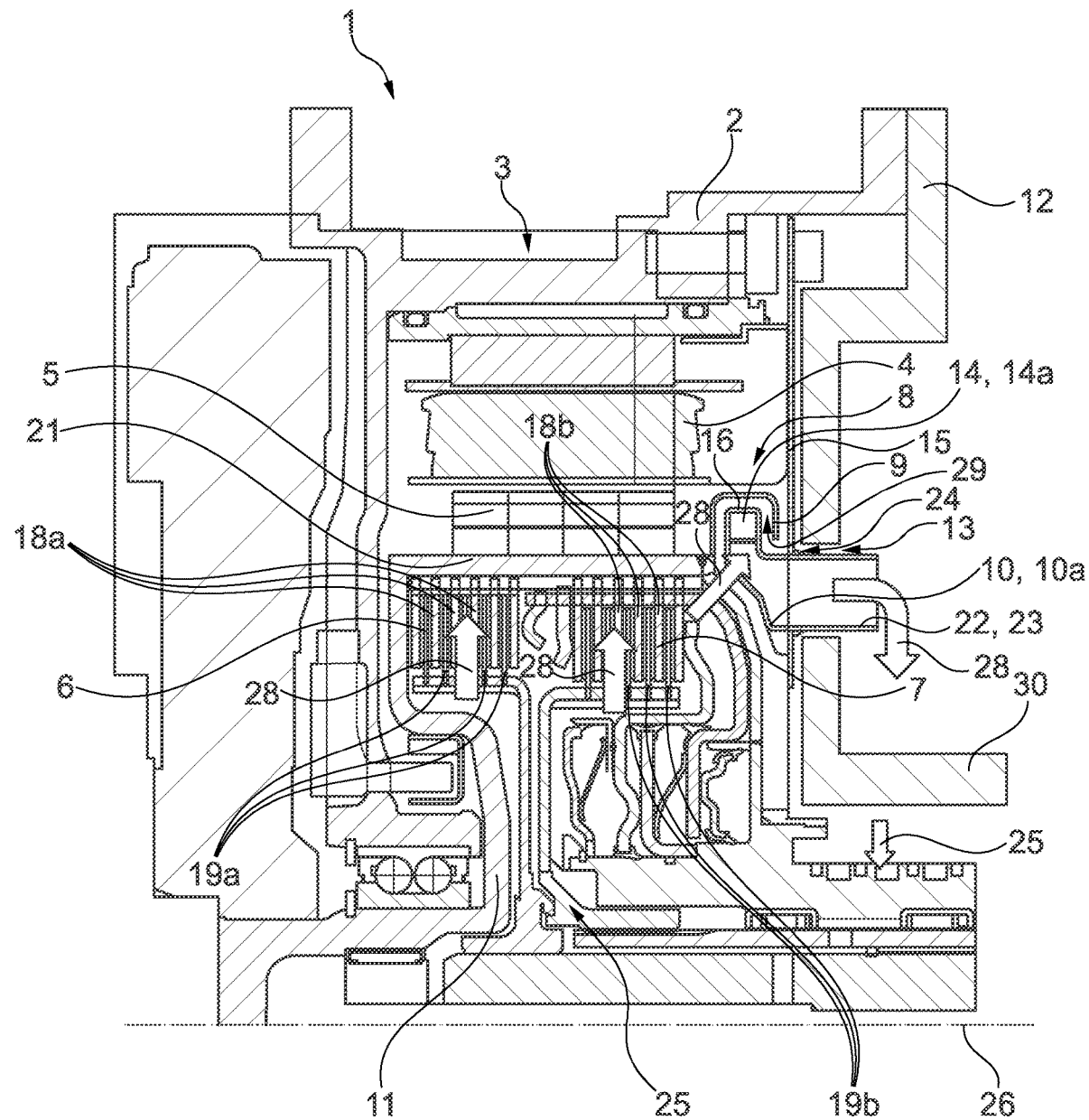
FIG. 2: shows a longitudinal section through the hybrid module of the first illustrative embodiment, similar to FIG. 1, wherein the hybrid module is illustrated in an operating state and a flow path of a hydraulic medium flowing through the friction clutches in the radial direction is illustrated.

It is readily apparent in FIG. 2 how the scoop section 10; 10a and the collecting region 9 interact during the operation of the hybrid module 1. This again illustrates that, during operation, a hydraulic medium enters an interior surrounded by the housing 2 at a central inlet 25 arranged radially within the friction elements 18a, 18b, 19a, 19b. The hydraulic medium is distributed in such a way in the axial and radial directions of the hybrid module 1 that a first portion of hydraulic medium flows through the friction elements 18a, 19a of the first friction clutch 6 and a further, second portion of hydraulic medium flows through the friction elements 18b, 19b of the second friction clutch 7 in the radial direction. The rotor support 11 is designed in such a way that it causes the hydraulic medium to build up radially outside the friction elements 18b, 19b and selectively feeds said hydraulic medium to the collecting region 9 axially adjoining the support, preferably via an axially extending collecting channel/collecting groove (not illustrated specifically for the sake of clarity). Thus, during operation, the hydraulic medium automatically enters the collecting region 9 radially outside the friction elements 18a, 18b, 19a, 19b. The hydraulic medium is discharged from the collecting region 9 via the scoop section 10; 10a and fed to a retaining chamber (not illustrated specifically here for the sake of clarity). The discharge line 22 of the scoop section 10; 10a projects in the axial direction through a through hole 13 in the side wall 12 secured to the housing, in this case a wall of a transmission housing.

Figure 3:
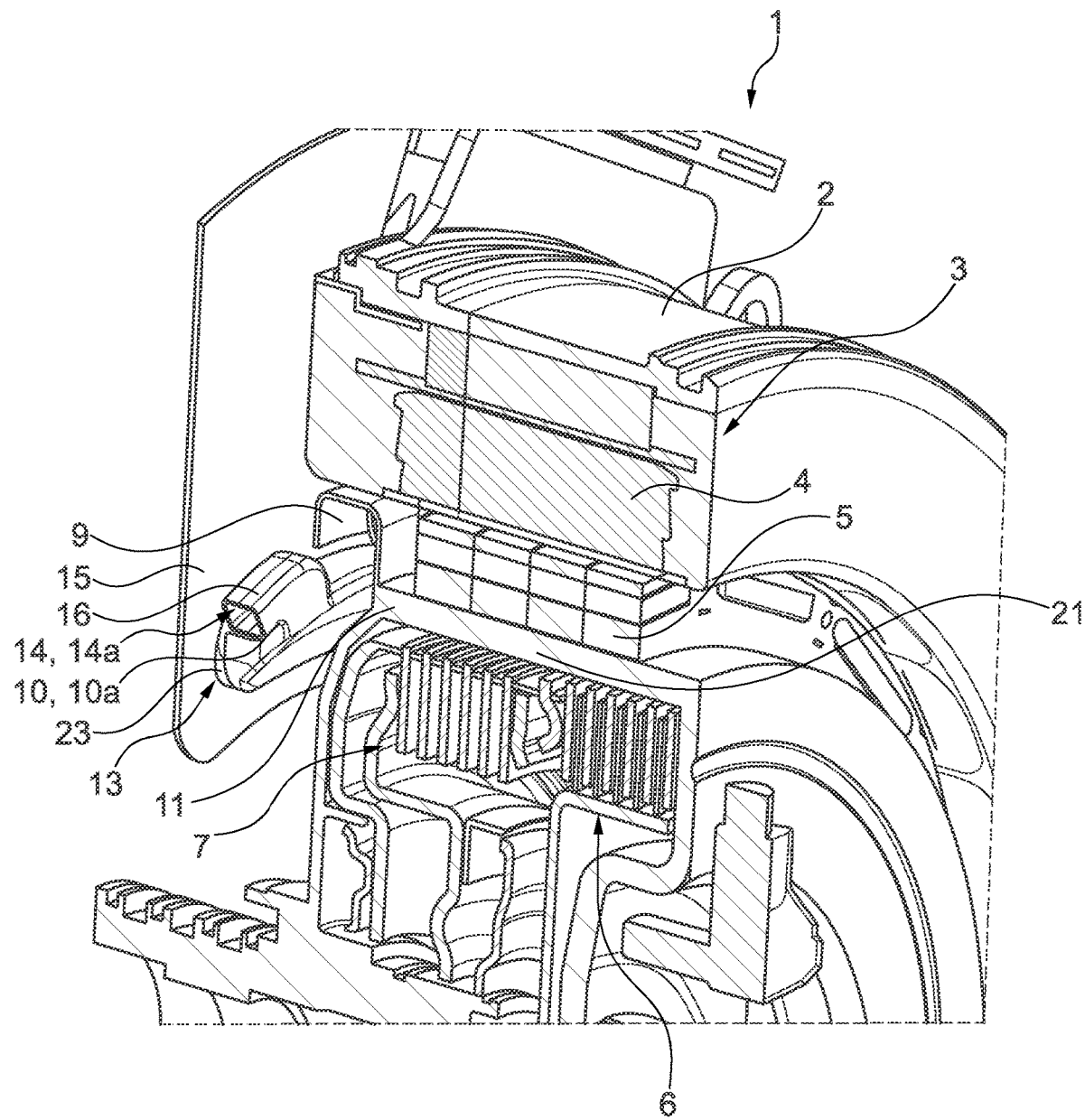
FIG. 3 shows a perspective illustration of the hybrid module of FIGS. 1 and 2 sectioned in the longitudinal direction.

In the illustration in FIG. 3, the holding element 15 in the form of a holding plate is readily visible in a perspective view, illustrating that the scoop section 10; 10a is attached in a manner fixed spatially in relation to the housing. The stub 23 penetrates the holding element 15 in the axial direction in the region of a through hole.

The collecting region 9 is connected materially to the rotor support 11 by a welded joint. However, once again, other material and/or nonpositive and/or positive connections are also possible in principle.

In respect of the subsequent illustrative embodiments, only the differences with respect to the first illustrative embodiments will be explored for the sake of brevity. Unless described specifically, the subsequent illustrative embodiments are therefore constructed and function as per the first illustrative embodiment.

A second illustrative embodiment of the hybrid module 1 is explained in conjunction with FIGS. 4 and 5. The collecting region 9 is formed from two metal sheet segments connected to one another by forming. Moreover, the collecting region 9 is no longer arranged radially within the stator 4, as in the first illustrative embodiment, but adjacent to the stator 4 in the axial direction. Accordingly, the shape of the holding element 11 is adapted, said holding element forming an arch/bend. A radial inside of the collecting region 9 has a diameter denoted by the reference sign 31, thereby defining the quantity of hydraulic medium which is received in the collecting region 9 during operation.

FIG. 5 then illustrates the retaining chamber 27 and the position of the scoop section 10; 10a in the circumferential direction.

Figure 7:
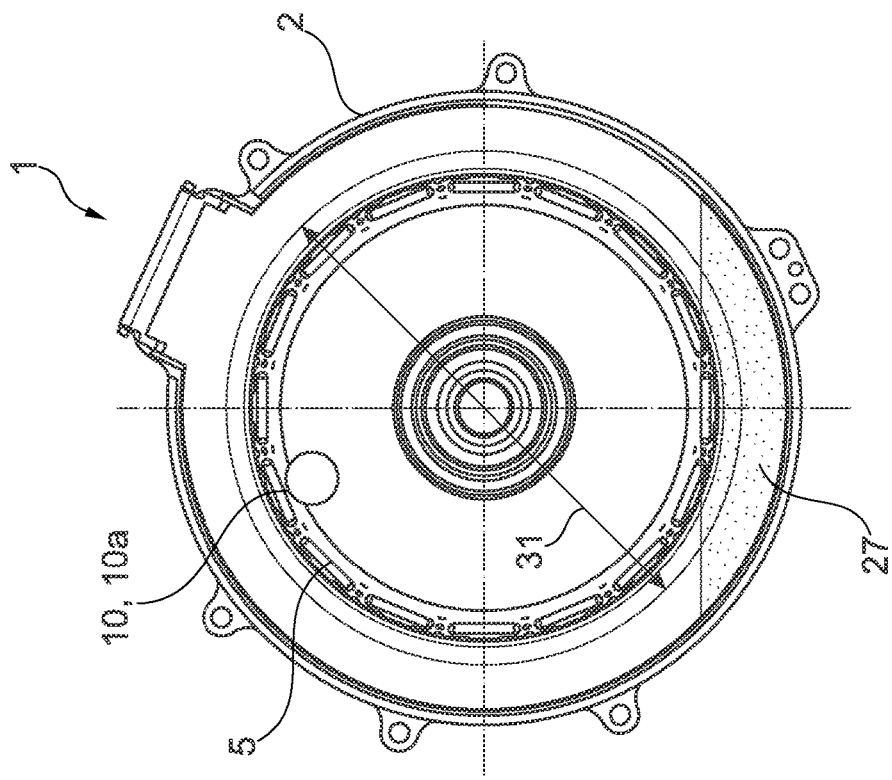
FIG. 7: shows a front view of the hybrid module according to FIG. 6 in order to illustrate the position of the scoop section.
Figure 6:
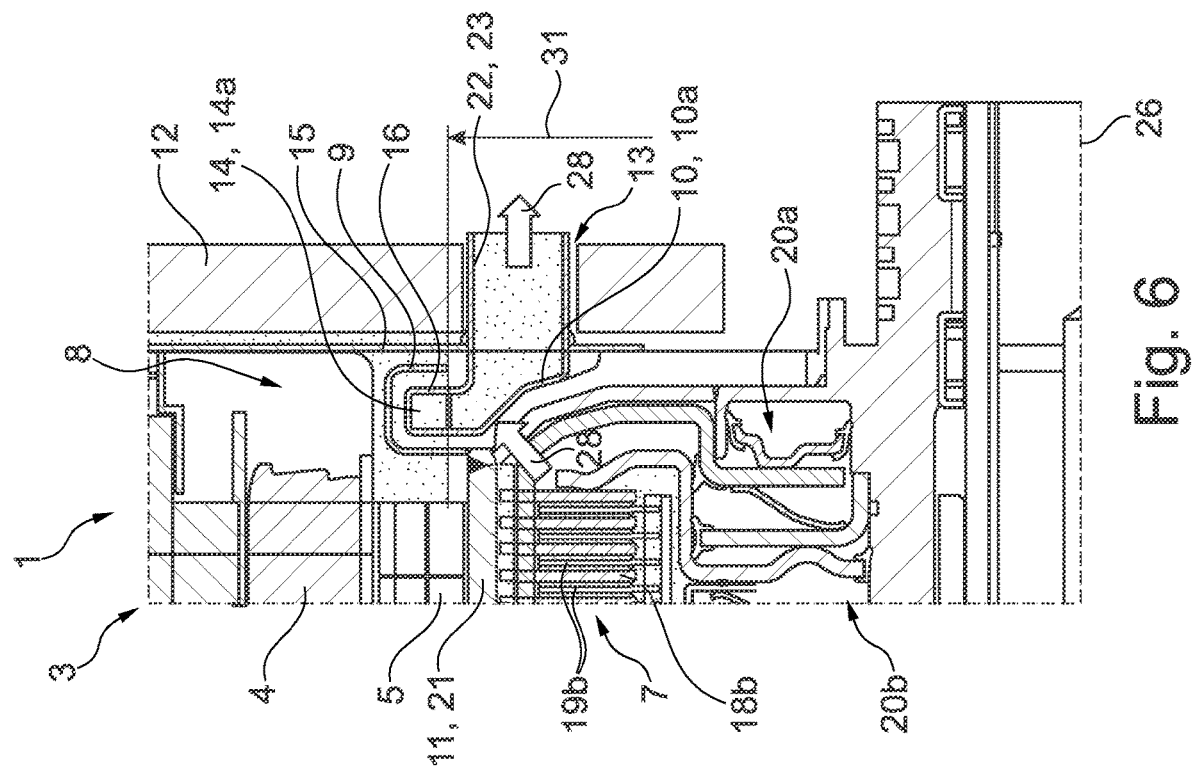
FIG. 6: shows a longitudinal section through a segment of a hybrid module according to the disclosure in accordance with a third illustrative embodiment, which is embodied substantially in accordance with the first illustrative embodiment but is configured somewhat differently as regards the shape of the side wall.

In the illustrative embodiment in FIGS. 6 and 7, it can be seen that the side wall 12 can also be of more massive design. Moreover, a dished region 30 is dispensed with on a radial inside of the side wall 12.

In the illustrative embodiment in FIGS. 8 and 9, it can be seen that the scoop section 10 can also be designed as a second scoop section 10b. In this illustrative embodiment, the second scoop section 10b is implemented as a scoop projection formed in a materially integral manner with the side wall 12. The second scoop section 10b thus forms a guide blade in the form of the scoop projection. The scoop projection once again projects into the collecting region 9 axially and radially and scoops up the hydraulic medium accumulated in the collecting region 9. The discharge line 22 is inserted directly in the side wall 12 in the form of the through hole 13.

In the illustrative embodiment in FIGS. 10 and 11, the collecting region 9 is not U-shaped, as previously, but substantially L-shaped in cross section. Here, the collecting region 9 is once again open inward in the radial direction.

In other words, according to the disclosure, a P1 or P2 hybrid (hybrid module 1) with an oil-cooled single/double or triple clutch 6, 7 is implemented within the rotor 5 of the electric machine 3. The cooling oil of the clutch(es) 6, 7 is collected in an oil collecting ring (collecting region 9) secured to the rotor and is carried onward via one or more scoop tubes 10; 10a into an adjacent oil chamber 27, e.g. of a transmission. The scoop tube 10; 10a can be embodied as a plastic part. The scoop tube 10; 10a can also be embodied as a sheet-metal part. Other materials are also conceivable. The scoop tube 10; 10a is preinstalled on the hybrid module 1 and, during assembly, enters a transmission opening (through hole 13). The scoop tube 10; 10a is embodied with a single inlet or multiple inlets (with one or more inlet openings 14; 14a, 14b). It is also possible for the cooling oil of the clutch 6, 7 to be collected in an oil collecting ring 9 secured to the rotor and carried onward via one or more oil collecting projections 10; 10b.

In FIG. 1, a hybrid module 1 is illustrated between an internal combustion engine and a transmission. A torsional vibration damper 17 is screwed to the crankshaft and transmits the engine torque to the rotor unit (rotor support 11) of the hybrid module 1 via splines. The hybrid module 1 has a housing 2, in which the stator 4 of an electric machine 3 is mounted. The rotor 5 of the electric machine 1 is fixed on the rotor unit 11 for conjoint rotation therewith. The oil-cooled double clutch consisting of two sub-clutches 6, 7 is integrated within this rotor unit 11. Single and also triple clutches are likewise possible. A U-shaped oil collecting ring 9 is secured on the rotor 5 for conjoint rotation therewith. A scoop tube 10a secured to the module 1 or the stator 4 by means of a holding element 15 for conjoint rotation therewith projects radially into said ring. The scoop tube 10a projects locally into a transmission housing bore (through hole 13). FIG. 2 shows the oil flow through the clutch 6, 7 integrated with the rotor. The oil is fed actively into the clutch 6, 7 from the transmission at a point 25, flows through the clutch and enables the clutch 6, 7 to be cooled. It emerges radially from the clutch cage at several points and is directed into an oil collecting ring 9, with which it rotates tangentially. The scoop tube 10a projecting in tangentially at one or more points collects the oil and carries it back axially into a transmission bore 13 and thus into the transmission.

In FIGS. 8 and 9, the oil entrained by the rotor 5 is collected by means of the oil collecting projection 10b in the housing 2; 12 and directed onwards into the transmission.

FIGS. 4 and 5 show a solution according to the disclosure with the position of the oil collecting ring 9 adjacent to the stator 4. The level in the oil sump (hydraulic medium in the retaining chamber 27) is determined by the diameter (diameter of a radial inside of the collecting region) of the oil collecting ring 9. The advantage of this solution is a relatively low level in the oil sump 27 after shutdown. Flooding of the air gap of the electric machine 3 during operation is completely prevented.

FIGS. 6 and 7 show a solution according to the disclosure with the position of the oil collecting ring 9 radially below the stator 4. It represents a compromise between the two previously described solutions. Here too, the level in the oil sump 27 is determined by the diameter of the oil collecting ring 9. The oil quantity that runs into the air gap during operation is smaller as compared with the solution in FIGS. 8 and 9 but, as a result, does not have the same axial space requirement as the solution in FIGS. 4 and 5.

FIG. 3 shows a detailed design according to the disclosure. It shows the holding element 11, the scoop tube 10a and the oil collecting ring 9. The connection of the scoop tube 10a to the holding element 11 can be accomplished in different ways, depending on the selected material:—plastic: press fitting, welding, clipping in etc.;—metal: press fitting, welding etc. This likewise applies to the connection of the oil collecting ring 9 to the rotor 5.

FIGS. 12 and 13 show an illustrative embodiment of the scoop tube 10*a* according to the disclosure made of plastic. In the case illustrated, it is embodied with two inlets in order to increase the possible delivery volume. Single- and multiple-inlet embodiments are conceivable. Here, the plastic tube 10*a* is clipped onto a holding plate 11 and retained by means of projections 24. Other materials and connections are conceivable.

FIGS. 10 and 11 show a solution according to the disclosure with the position of the oil collecting ring 9 radially below the stator 4. One or more oil collecting projections 10*b* project into this oil collecting ring 9 in the circumferential direction and carry the oil back into the transmission via one or more housing bores 13.

LIST OF REFERENCE SIGNS

1 hybrid module
2 housing
3 electric machine
4 stator
5 rotor
6 first friction clutch
7 second friction clutch
8 cooling device
9 collecting region
10 scoop section
10*a* first scoop section
10*b* second scoop section
11 rotor support
12 side wall
13 through hole
14 inlet opening
14*a* first inlet opening
14*b* second inlet opening
15 holding element
16 scoop cup
17 torsional vibration damper
18*a* first friction element of the first friction clutch
18*b* first friction element of the second friction clutch
19*a* second friction element of the first friction clutch
19*b* second friction element of the second friction clutch
20*a* first actuating device
20*b* second actuating device
21 sleeve region
22 discharge line
23 stub
24 latching projection
25 central inlet
26 axis of rotation
27 retaining chamber
28 direction arrow
29 opening
30 dished region
31 diameter

The invention claimed is:

1. A hybrid module for a drive train of a motor vehicle, comprising a housing, an electric machine disposed within the housing and having a stator and a rotor arranged radially within the stator, the rotor including a rotor support having a sleeve region arranged to support the rotor on an outer surface thereof and first and second hydraulically cooled friction clutches arranged radially within the rotor, wherein the first and the second clutches each have an outer set of friction plates connected to an inner surface of the sleeve region of the rotor support, wherein a cooling device is provided that is configured to cool a plurality of friction surfaces of the first and the second clutches and which has an annular collecting region coupled to the rotor for conjoint rotation therewith and entraining a hydraulic medium during operation, as well as a scoop section, which is secured to the housing and projects into the collecting region and via which the hydraulic medium is fed to a retaining chamber during operation, wherein the collecting region includes a radially inward-facing opening, wherein the collecting region is arranged at one axial end of the sleeve region such that the radially inward-facing opening is not covered by the sleeve region.

2. The hybrid module as claimed in claim 1, wherein the collecting region is mounted for conjoint rotation on the rotor support supporting the rotor.

3. The hybrid module as claimed in claim 1, wherein a first scoop section is provided which is designed as a scoop tube that enters the collecting region.

4. The hybrid module as claimed in claim 3, wherein the scoop tube projects through a through hole introduced into a side wall secured to the housing.

5. The hybrid module as claimed in claim 1, wherein a second scoop section is provided which is designed as a scoop projection attached directly to a side wall secured to the housing.

6. The hybrid module as claimed in claim 1, wherein the scoop section has at least one inlet opening, which faces in a circumferential direction of the rotor and projects into the collecting region in the radial direction.

7. The hybrid module as claimed in claim 1, wherein the scoop section is formed from a plastic or a metal.

8. The hybrid module as claimed in claim 1, wherein the scoop section is secured directly or indirectly on the housing by a holding element.

9. The hybrid module as claimed in claim 1, wherein a plurality of scoop sections is arranged in a manner distributed in a circumferential direction.

10. A hybrid drive train for a motor vehicle, having a hybrid module as claimed in claim 1.

11. The hybrid module as claimed in claim 1, wherein the first and the second clutches are arranged within two mutually opposite side faces of the stator in an axial direction.

* * * * *